Aug. 14, 1923.  
W. VON KOTHEN  
1,464,786

SOLID TRUCK TIRE

Filed Jan. 16, 1922

Witness:  
R. E. Hamilton

Inventor:  
W<sup>m</sup>. Von Kothen  
By Thorpe & Gerard  
Att'ys.

Patented Aug. 14, 1923.

1,464,786

UNITED STATES PATENT OFFICE.

WILLIAM von KOTHEN, OF KANSAS CITY, MISSOURI.

SOLID TRUCK TIRE.

Application filed January 16, 1922. Serial No. 529,524.

*To all whom it may concern:*

Be it known that I, WILLIAM VON KOTHEN, a citizen of the United States, and resident of Kansas City, Jackson County, State of Missouri, have invented a certain new and useful Improvement in Solid Truck Tires, of which the following is a complete specification.

This invention relates to resilient cushion tires, and more especially to that class used on automobile trucks.

Before proceeding with a detailed description of the invention, it is desirable to call attention to the fact that there are many truck tires of the class under consideration, i. e., known as solid cushion tires, in which circular grooves and notches are provided for guarding against undue generation of heat which is destructive to the rubber, for accommodating the "flow" of the rubber as compression thereof occurs, and for giving better traction and non-skidding properties, but all such tires with which I am familiar, "check" at the edges and "pit" or flatten on the tread surfaces after a comparatively short period of service, and my experience in the use, repair, marketing and exchanging of such tires, has shown that the provision of one or more grooves alone or in conjunction with notches in the edges of such tires now in use, while increasing tractional power and reducing wear to an appreciable extent, does not provide for sufficient "flow" to prevent checking at the edges nor "pitting" in the tread, and my object is to provide a tire which possesses greater tractional power and greater cooling and flowing properties and which, consequently, is more economical in service.

With this general object in view, the invention consists in certain novel and useful features of construction as hereinafter described and claimed; and in order that it may be fully understood, reference is to be had to the accompanying drawing, in which:—

In the said drawing, 1 indicates the rim of a truck wheel of the customary channel form and provided on the tread surface thereof with the usual projections 2 for engagement by a hard rubber base 3, upon which is mounted the softer body 4 of rubber, and said body portion in the narrower type of tire is provided centrally with a peripheral groove 5, and in the wider type of such tires with a pair of such grooves, these grooves serving for circulation of air to avoid as far as practicable, the over-heating of the tires when the car equipped with them is travelling at a relatively high speed.

Figure 1:
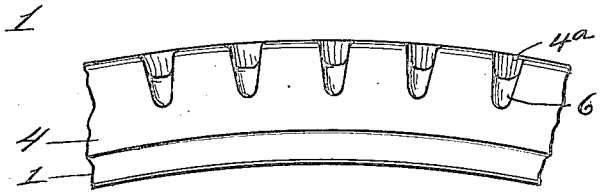
Figure 1 is a fragmental side view of a cushion tire embodying the invention.
Figure 2:
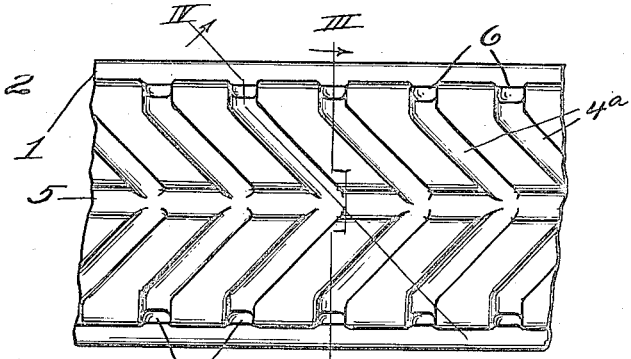
Figure 2 is a top plan view of the construction shown by Figure 1.
Figure 3:
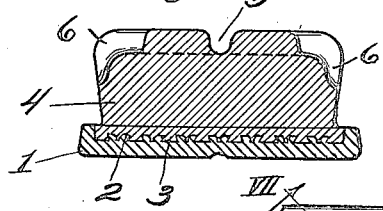
Figure 3 is a cross section taken on the line III—III of Figure 2.
Figure 4:
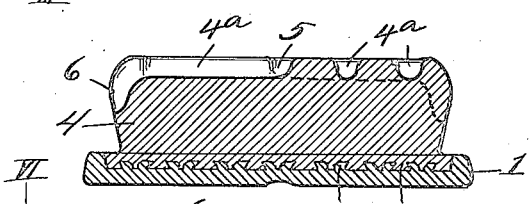
Figure 4 is a section taken on the line IV—IV of Figure 2.

In each side edge of the body portion 4 of the tire are provided equi-spaced notches 6, the notches in one edge being disposed in transverse alignment with the notches in the opposite edge, and each set of such oppositely-disposed notches, are connected by obliquely-extending grooves 4ª, with the peripheral groove 5, the obliquely-extending grooves converging from the said notches to the said peripheral groove, and in this connection it will be noted by reference particularly to Figure 2, that the point of intersection of each pair of obliquely-disposed grooves 4ª with the groove 5 is in substantially transverse alinement with respect to the point of intersection of the next adjacent pair of obliquely-disposed grooves with their respective side edge notches 6. Because of this arrangement, it will thus be seen that the tractional engagement of the tire with the ground is equally distributed at all times at both sides of the peripheral groove, that is to say all twisting strain tending to impose a greater portion of the load at one side of the peripheral groove than at the opposite side is avoided or eliminated, as is the case where the traction is unequal at times at opposite sides of the peripheral groove, as for example, in such tires that have the edge grooves in staggered relation to each other. It will also be noted that by having the opposite ends of each pair of obliquely-disposed grooves in intersecting or overlapping relation to the adjacent ends of the adjoining grooves anti-skidding surfaces are presented and are in active operation during the entire revolution of the wheel as well as making for a more complete circulation of air for cooling purposes. It is preferable from a manufacturing standpoint that the peripheral groove and oblique grooves should be of equal depth and the edge notches somewhat deeper, but it will be understood that it is not intended to restrict the invention to having any fixed relation of depth of the grooves and notches.

The most important feature of the construction described, however, is that it provides for a sufficient and natural "flow" of the rubber, and for permitting the same after the flowing operation to react or return to normal condition without any destructive twisting or sidewise scraping in such reacting movement, as it has been found that all tires of this character in which the side or edge notches are disposed in staggered relation, the reaction following flowing movement is so severe that it results in not only "pitting" or "cupping" the tread surfaces between the peripheral groove and the notched edges, but also produces diagonal cracks or checks in the side edges of the tire and that they are soon transformed from smooth rounded corners or edges to serrated or tooth-like edges which presents such roughened surfaces that they wear or chip off with great rapidity and thus reduce the actual width of the tread surface of the tire and in consequence the latter wears much more rapidly than would otherwise be the case. By the construction described herein, it will be seen that the portions of the tread at opposite sides of the peripheral groove are enabled to flow in all directions, forward, rearward, inwardly and outwardly, and as a consequence the reaction is in all directions so that the reaction from the rear sides with respect to the direction of rotation is opposite to the reaction from the front sides with respect to the direction of rotation, and that likewise the reaction from the inner side and from the outer side is in opposing directions. These counteracting reactions tend to bring the portions of the tread immediately after the weight of the load is removed by the travel of the wheel, back to normal condition without any material frictional scraping, sidewise or otherwise on the surface of the roadway, and will guard materially in preventing pitting or cupping and also against chipping or checking.

It will thus be seen that I have produced a solid cushion tire which not only provides for efficient cooling and equalized traction, but also insures a rolling contact with the surface analogous to that of a hard surface tire, and hence increases the life of the tire by minimizing the possibility of checking and the consequent narrowing of the tread surface of the tire.

Figure 5:
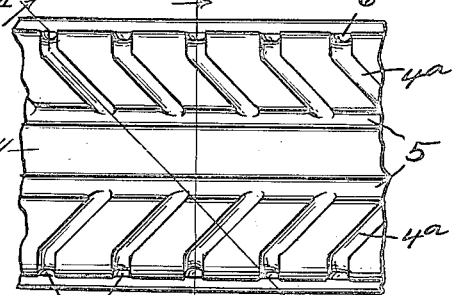
Figure 5 is a view corresponding to Figure 2, but on a reduced scale and illustrates a type of tire of greater width than the type disclosed by Figure 2.
Figure 8:
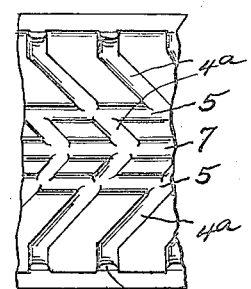
Figure 8 is a view of a tire similar to that shown in Figure 5, but of slightly modified construction.
Figure 6:
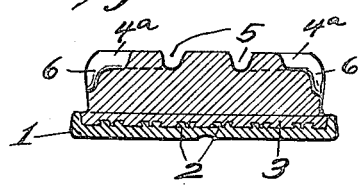
Figure 6 is a cross section on the line VI—VI of Figure 5.
Figure 7:
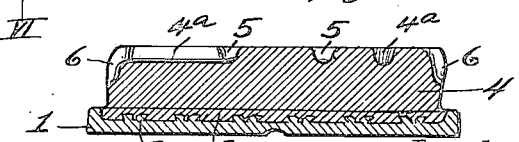
Figure 7 is a section on the line VII—VII of Figure 5.

In Figures 5, 6 and 7, the same principle of construction is followed, but the tire represented is of a wider type for the very large trucks, which tires contain such a large amount of rubber that they are usually provided with a pair of the peripheral grooves 5. In this case, therefore, it is preferable to leave the intermediate portion of the tread, that is the portion between the pair of peripheral grooves, in solid condition, though it is obvious that if desired, the obliquely-extending grooves may extend to the center of the tire and if desired, communicate with a third or central peripheral groove 7 (see Figure 8). This is not believed to be necessary, however, as the central portion can be sufficiently cooled by the pair of peripheral grooves, and because it is important that the side edge grooves are the chief points to be protected as at such points the flowing action of the rubber is greatest, and it is desired to localize the reaction of the rubber near such points, if possible.

From the above description it will be apparent that I have produced a solid cushion tire for trucks and the like, which embodies the features of advantage set forth as desirable in the statement of the object of the invention, and which is obviously susceptible of modifications in minor particulars without departing from the principle of construction involved or from the spirit and scope of the appended claims.

I claim:

1. A resilient cushion tire having a peripheral groove and edge notches of greater depth than the peripheral groove, and also having obliquely-disposed grooves connecting the peripheral groove and edge notches respectively; said oblique grooves and peripheral groove being of equal depth.

2. A resilient cushion tire having a peripheral groove and outwardly disposed edge notches, and also having obliquely disposed grooves connecting the peripheral groove and edge notches respectively; the point of communication of each pair of oblique grooves with the peripheral groove being substantially in transverse alinement with a pair of notches common to the adjacent pair of oblique grooves.

3. A resilient cushion tire having edge notches in transverse alinement, and also having obliquely disposed and substantially parallel grooves in the tread portion communicating with the edge notches respectively; the opposite ends of each pair of said oblique grooves being in substantially transverse alinement with a pair of notches common to the adjacent pair of oblique grooves.

4. A resilient cushion tire having a peripheral groove and edge notches disposed in pairs in the same transverse planes, and also having obliquely-extending grooves connecting the notches with the peripheral groove.

5. A resilient cushion tire having a peripheral groove and edge notches disposed in pairs in the same transverse planes, and also having obliquely-extending grooves connecting the notches with the peripheral groove; the grooves leading from pairs of notches in the same transverse planes converging and communicating with the peripheral groove at the opposite sides thereof and in transverse alinement.

6. A resilient cushion tire having a peripheral groove and edge notches disposed in pairs in the same transverse planes, and also having obliquely-extending grooves connecting the notches with the peripheral groove; the grooves leading from pairs of notches in the same transverse planes converging and communicating with the peripheral groove in the transverse planes occupied by edge notches adjacent those from which the converging grooves lead.

In witness whereof I hereunto affix my signature.

WILLIAM von KOTHEN.